(12) United States Patent
Yoshino

(10) Patent No.: US 11,442,320 B2
(45) Date of Patent: Sep. 13, 2022

(54) LIGHT CONTROL SHEET AND METHOD OF PRODUCING LIGHT CONTROL SHEET

(71) Applicant: TOPPAN PRINTING CO., LTD., Tokyo (JP)

(72) Inventor: Masaaki Yoshino, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/125,077

(22) Filed: Dec. 17, 2020

(65) Prior Publication Data

US 2021/0141259 A1 May 13, 2021

Related U.S. Application Data

(60) Provisional application No. PCT/JP2019/024042, filed on Jun. 18, 2019.

(30) Foreign Application Priority Data

Jun. 18, 2018 (JP) .............................. JP2018-115228

(51) Int. Cl.
*G02F 1/1343* (2006.01)
*B23K 26/00* (2014.01)
*B23K 26/24* (2014.01)

(52) U.S. Cl.
CPC ...... *G02F 1/13439* (2013.01); *B23K 26/0006* (2013.01); *B23K 26/24* (2013.01)

(58) Field of Classification Search
CPC .. G02F 1/13439; B23K 26/0006; B23K 26/24
See application file for complete search history.

(56) References Cited

U.S. PATENT DOCUMENTS

| 6,236,442 B1 | 5/2001 | Stephenson et al. |
| 2016/0138328 A1 | 5/2016 | Behmke et al. |
| 2018/0011359 A1* | 1/2018 | De Jong ............... G02F 1/1334 |

(Continued)

FOREIGN PATENT DOCUMENTS

| JP | H07-320637 A | 12/1995 |
| JP | H11-202362 A | 7/1999 |

(Continued)

OTHER PUBLICATIONS

Extended European Search Report dated Jun. 30, 2021 in European Patent Application No. 19822148.3, 10 pages.

(Continued)

*Primary Examiner* — Tracie Y Green
(74) *Attorney, Agent, or Firm* — Oblon, McClelland, Maier & Neustadt, L.L.P.

(57) ABSTRACT

A method of producing a light control sheet includes forming a multilayer laminate in which a light control layer comprising a liquid crystal composition is sandwiched between a first transparent conductive layer formed on a first transparent support layer and a second transparent conductive layer formed on a second transparent support layer, and conducting laser irradiation to the multilayer laminate such that a laser beam penetrates one of the first and second transparent support layers located closer to a laser source than the first transparent conductive layer, and that an insulating portion is formed in the first transparent conductive layer.

20 Claims, 12 Drawing Sheets

(56) References Cited

U.S. PATENT DOCUMENTS

2018/0120688 A1* 5/2018 Kurashige .............. G03B 21/60
2018/0239189 A1* 8/2018 Koito ................ G02F 1/133526

FOREIGN PATENT DOCUMENTS

| JP | 2000-089688 A | 3/2000 |
| JP | 2007-005345 A | 1/2007 |
| JP | 2018-507471 A | 3/2018 |
| JP | 6493598 B1 * | 4/2019 |
| WO | WO 2018/061358 A1 | 4/2018 |

OTHER PUBLICATIONS

International Search Report dated Jul. 30, 2019 in PCT/JP2019/024042, filed Jun. 18, 2019, (with English Translation).

* cited by examiner

LASER IRRADIATED REGION

NON-LASER IRRADIATED REGION

NON-LASER IRRADIATED REGION

LIGHT CONTROL SHEET AND METHOD OF PRODUCING LIGHT CONTROL SHEET

CROSS-REFERENCE TO RELATED APPLICATIONS

The present application is a continuation of International Application No. PCT/JP2019/024042, filed Jun. 18, 2019, which is based upon and claims the benefits of priority to Japanese Application No. 2018-115228, filed Jun. 18, 2018. The entire contents of all of the above applications are incorporated herein by reference.

BACKGROUND OF THE INVENTION

Field of the Invention

The present invention relates to a light control sheet and a method for producing the light control sheet.

Discussion of the Background

A light control sheet includes a light control layer containing a liquid crystal composition, a pair of transparent electrode layers sandwiching the light control layer, and a pair of transparent support layers sandwiching the light control layer and the pair of transparent electrode layers. Depending on a potential difference between the pair of transparent electrode layers, an alignment state of the liquid crystal molecules varies, and thus a light transmittance of the light control sheet varies.

In recent years, there have been proposed light control devices that include a light control sheet having a plurality of light control sections so that light transmittance can be changed for each of the light control sections (for example, see WO 2018/061358) In the light control sheet having the plurality of light control sections, at least a first transparent electrode layer includes a plurality of electrode sections. An arrangement of the plurality of electrode sections corresponds to an arrangement of the plurality of light control sections. In the transparent electrode layer, each electrode section is insulated from the other electrode sections. The light control device controls a potential difference between the transparent electrode layers for each of the light control sections according to a voltage signal independently inputted to each of the plurality of electrode sections.

SUMMARY OF THE INVENTION

According to an aspect of the present invention, a light control sheet includes a light control layer comprising a liquid crystal composition, a pair of transparent electrode layers including a first transparent electrode layer and a second transparent electrode layer, and sandwiching the light control layer, and a pair of transparent support layers sandwiching the light control layer and the pair of transparent electrode layers. The first transparent electrode layer includes an insulating portion that has a structure formed by laser irradiation.

According to another aspect of the present invention, a method of producing a light control sheet includes forming a multilayer laminate in which a light control layer comprising a liquid crystal composition is sandwiched between a first transparent conductive layer formed on a first transparent support layer and a second transparent conductive layer formed on a second transparent support layer, and conducting laser irradiation to the multilayer laminate such that a laser beam penetrates one of the first and second transparent support layers located closer to a laser source than the first transparent conductive layer, and that an insulating portion is formed in the first transparent conductive layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
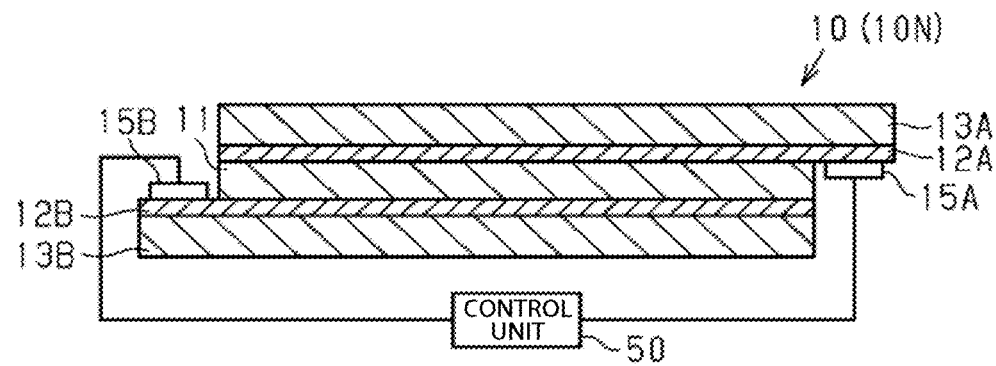
FIG. 1 is a view illustrating a cross-sectional structure of a normal type light control sheet according to an embodiment of a light control sheet.

The embodiments will now be described with reference to the accompanying drawings, wherein like reference numerals designate corresponding or identical elements throughout the various drawings.

With reference to FIGS. 1 to 25, an embodiment of a light control sheet and a method of producing a light control sheet will be described.

(Light Control Device)

An overall configuration of a light control device having a light control sheet of the present embodiment will be described.

As shown in FIG. 1, a light control device includes a light control sheet 10 and a control unit 50 that controls a drive voltage applied to the light control sheet 10. The light control sheet 10 has either a normal type structure or a reverse type structure. FIG. 1 shows a cross-sectional structure of a normal type light control sheet 10N.

The normal type light control sheet 10N includes a light control layer 11, a pair of transparent electrode layers composed of a first transparent electrode layer 12A and a second transparent electrode layer 12B, and a pair of transparent support layers composed of a first transparent support layer 13A and a second transparent support layer 13B. The first transparent electrode layer 12A and the second transparent electrode layer 12B sandwich the light control layer 11, and the first transparent support layer 13A and the second transparent support layer 13B sandwich the light control layer 11 and the transparent electrode layers 12A and 12B. The first transparent support layer 13A supports the first transparent electrode layer 12A, and the second transparent support layer 13B supports the second transparent electrode layer 12B.

The first transparent electrode layer 12A is connected to the control unit 50 via a wire extending from a first terminal section 15A disposed on a surface of the first transparent electrode layer 12A. The second transparent electrode layer 12B is connected to the control unit 50 via a wire extending from a second terminal section 15B disposed on a surface of the second transparent electrode layer 12B. The first terminal section 15A is disposed on an end of the light control sheet 10N in a region where the first transparent electrode layer 12A is exposed from the light control layer 11, the second transparent electrode layer 12B, and the second transparent support layer 13B. The second terminal section 15B is disposed on another end of the light control sheet 10N in a region where the second transparent electrode layer 12B is exposed from the light control layer 11, the first transparent electrode layer 12A, and the first transparent support layer 13A. The terminal sections 15A and 15B form a part of the light control sheet 10N.

Figure 2:
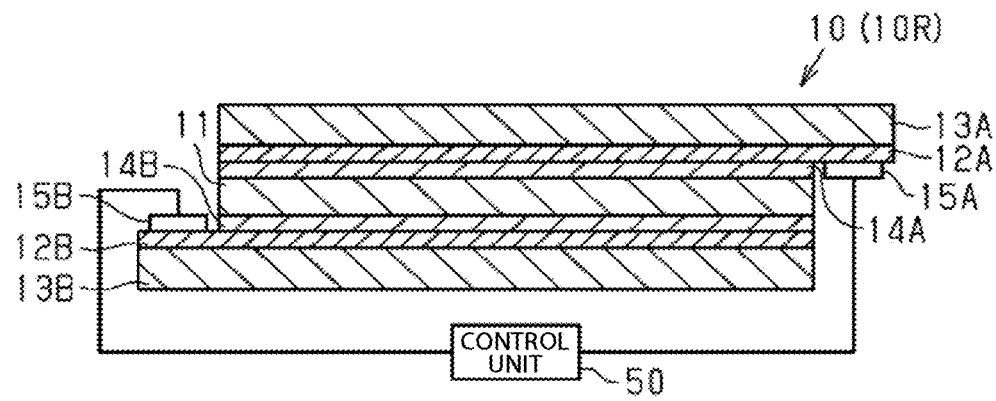
FIG. 2 is a view illustrating a cross-sectional structure of a reverse type light control sheet according to an embodiment of a light control sheet.

FIG. 2 shows a cross-sectional structure of a reverse type light control sheet 10R. The reverse type light control sheet 10R includes a first alignment layer 14A and a second alignment layer 14B, which are a pair of alignment layers sandwiching the light control layer 11, in addition to the light control layer 11, the transparent electrode layers 12A and 12B, and the transparent support layers 13A and 13B. The first alignment layer 14A is disposed between the light control layer 11 and the first transparent electrode layer 12A, and the second alignment layer 14B is disposed between the light control layer 11 and the second transparent electrode layer 12B.

The alignment layers 14A and 14B are, for example, vertical alignment layers. When the first transparent electrode layer 12A and the second transparent electrode layer 12B are at the same potential, the alignment layers 14A and 14B align the major axis direction of the liquid crystal molecules included in the light control layer 11 into a direction normal to a plane in which the alignment layers 14A and 14B extend. On the other hand, when a potential difference is applied between the transparent electrode layers 12A and 12B, the alignment layers 14A and 14B can change the major axis direction of the liquid crystal molecules included in the light control layer 11 to a direction other than the above normal direction.

The normal type and reverse type light control sheets 10 have the same planar structure.

Figure 3:
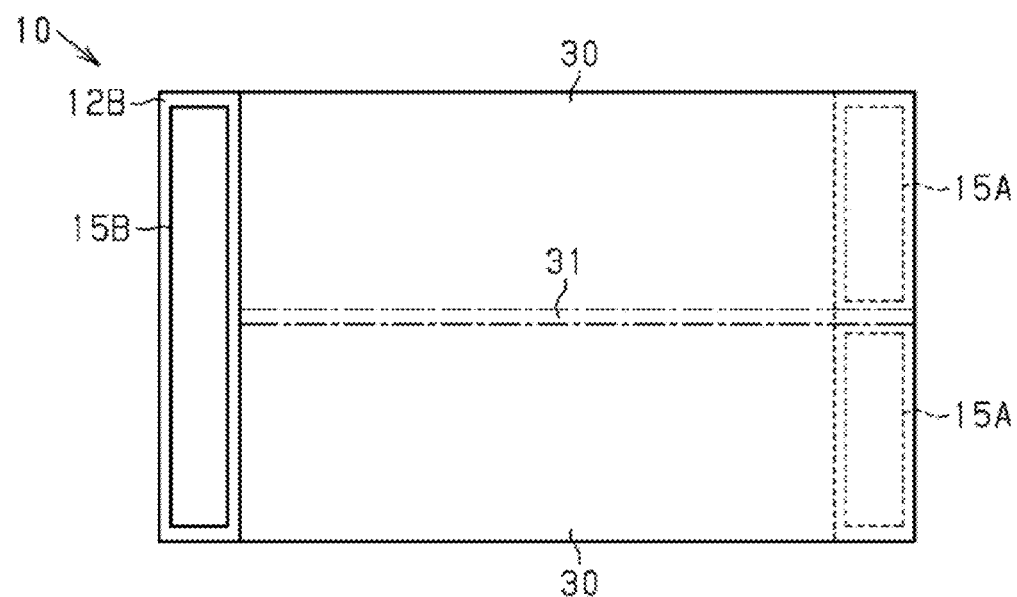
FIG. 3 is a view illustrating a planar structure of a light control sheet according to an embodiment.

As shown in FIG. 3, the light control sheet 10 includes a plurality of light control sections 30, and a boundary section 31 located between the light control sections 30 adjacent to each other when viewed in a direction perpendicular to a surface of the light control sheet 10. The light control section 30 is a region having a variable light transmittance. Each light control section 30 has a strip shape extending in a common direction, and a plurality of light control sections 30 are arranged side by side in a direction perpendicular to the extending direction of the light control section 30. The figure shows an example in which the light control sheet 10 includes two light control sections 30. The boundary section 31 extends linearly in the extending direction of the light control section 30. The adjacent light control sections 30 are partitioned by the boundary section 31.

In the figure, the width of the boundary section 31 is exaggerated. Further, the figure shows an example in which the first terminal section 15A extends along a first side of the light control sheet 10, and the second terminal section 15B extends along a second side facing the first side, but the arrangement of the terminal sections 15A and 15B is merely an example.

Figure 4:
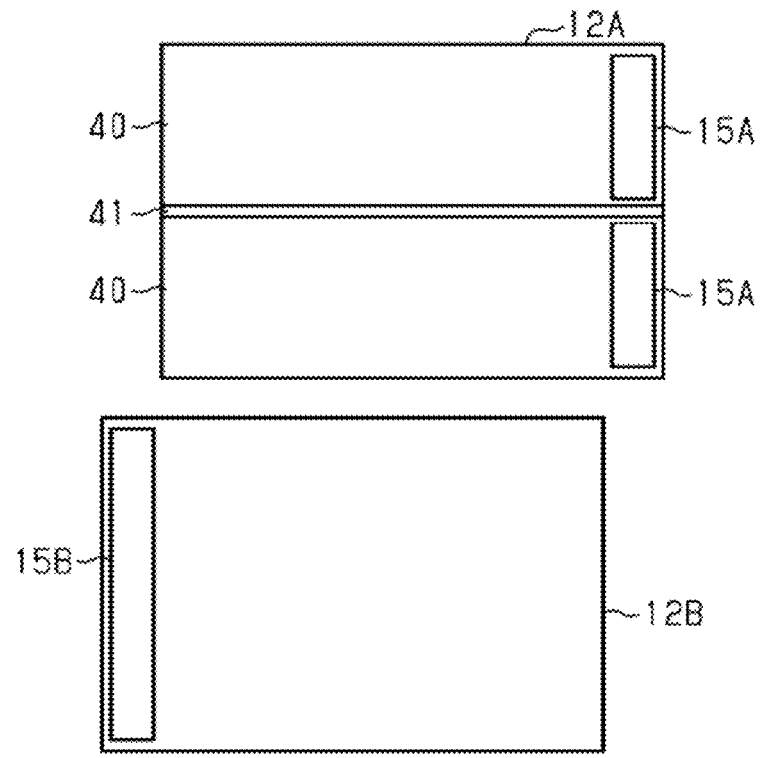
FIG. 4 is a view illustrating a planar structure of a transparent electrode layer of a first form in a light control sheet according to an embodiment.
Figure 5:
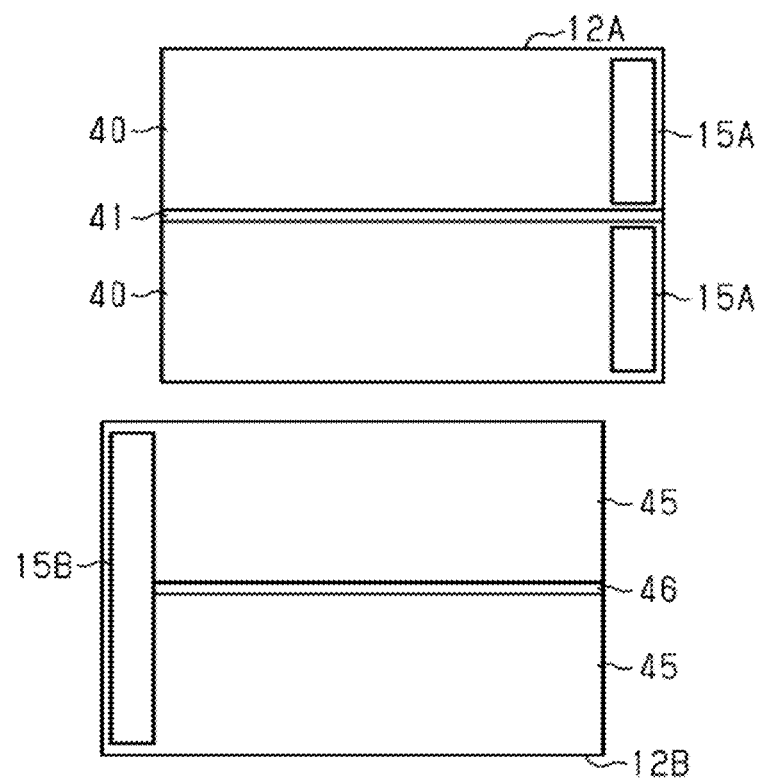
FIG. 5 is a view illustrating a planar structure of a transparent electrode layer of a second form in a light control sheet of an embodiment.

The following description will be given of a first form and a second form in which electrode sections in the transparent electrode layers 12A and 12B are divided. FIGS. 4 and 5 are planar views of a laminate having the first transparent electrode layer 12A, the first transparent support layer 13A, and the first terminal section 15A as viewed in a direction perpendicular to the first transparent electrode layer 12A, and a laminate having the second transparent electrode layer 12B, the second transparent support layer 13B, and the second terminal section 15B as viewed in a direction perpendicular to the second transparent electrode layer 12B. FIG. 4 shows a first form, and FIG. 5 shows a second form.

As shown in FIG. 4, in the first form, the first transparent electrode layer 12A includes a plurality of electrode sections 40, and an insulating section 41 located between the electrode sections 40 adjacent to each other. The electrode section 40 is an example of a conductive portion. Each electrode section 40 has a strip shape extending in a common direction, and a plurality of electrode sections 40 are arranged side by side in a direction perpendicular to the extending direction of the electrode section 40. The insulating section 41 extends linearly in the extending direction of the electrode section 40. The insulating section 41 has a configuration in which insulating portions are continuously arranged in the extending direction of the insulating section 41. The adjacent electrode sections 40 are insulated from each other by the insulating section 41.

In a region where the light control layer 11 is located as viewed in a direction perpendicular to a surface of the light control sheet 10, a region where the electrode section 40 is located corresponds to a region where the light control section 30 is located, and a region where the insulating section 41 is located corresponds to a region where the boundary section 31 is located.

The first terminal section 15A is provided for each of the electrode sections 40. A plurality of electrode sections 40 are individually connected to the control unit 50, and different voltage signals are supplied from the control unit 50 to each of the plurality of electrode sections 40.

In the first form, the second transparent electrode layer 12B does not include an insulating section that partitions the electrode section, and the second transparent electrode layer 12B as a whole functions as one electrode section. One second terminal section 15B is provided for one second transparent electrode layer 12B.

As shown in FIG. 5, in the second form, the first transparent electrode layer 12A includes the same configuration as that of the first form. On the other hand, in the second form, the second transparent electrode layer 12B includes a plurality of electrode sections 45, and a strip section 46 located between the electrode sections 45 adjacent to each other. Each electrode section 45 has a strip shape extending in a common direction, and a plurality of electrode sections 45 are arranged side by side in a direction perpendicular to the extending direction of the electrode section 45. The strip section 46 extends linearly in the extending direction of the electrode section 45. In a region where the light control layer 11 is located as viewed in a direction perpendicular to a surface of the light control sheet 10, a region where the electrode section 45 is located corresponds to a region where the light control section 30 is located, and a region where the strip section 46 is located corresponds to a region where the boundary section 31 is located.

The strip section 46 has insulating properties in at least part of the extending direction of the strip section 46. The strip section 46 has a configuration in which insulating portions are intermittently arranged or continuously arranged in the extending direction of the strip section 46.

One second terminal section 15B is provided for a plurality of electrode sections 45. A common voltage signal is supplied from the control unit 50 to each of the plurality of electrode sections 45. As long as a common voltage signal is supplied to the plurality of electrode sections 45, the second terminal section 15B may be provided for each of the electrode sections 45.

In either the first form or the second form, the control unit 50 supplies one voltage signal to the second transparent electrode layer 12B, and different voltage signals to each of the electrode sections 40 in the first transparent electrode layer 12A. Accordingly, the potential difference between the first transparent electrode layer 12A and the second transparent electrode layer 12B is controlled for each light control section 30.

In the normal type, when a potential difference is applied between the first transparent electrode layer 12A and the second transparent electrode layer 12B, the liquid crystal molecules included in the light control layer 11 are aligned so that the major axis directions of the liquid crystal molecules are oriented parallel to the direction of the electric field between the transparent electrode layers 12A and 12B. As a result, light is more likely to be transmitted through the light control layer 11 and the light control section 30 becomes transparent. On the other hand, when the first transparent electrode layer 12A and the second transparent electrode layer 12B are at the same potential, the major axis directions of the liquid crystal molecules are irregular. Therefore, light incident on the light control layer 11 is scattered. Accordingly, the light control section 30 becomes cloudy and opaque.

In the reverse type, when a potential difference is applied between the first transparent electrode layer 12A and the second transparent electrode layer 12B, the major axis directions of the liquid crystal molecules in the light control layer 11 are different from the normal direction of the alignment layers 14A and 14B. Accordingly, the light control section 30 is opaque. On the other hand, when the first transparent electrode layer 12A and the second transparent electrode layer 12B are at the same potential, the alignment layers 14A and 14B align the liquid crystal molecules so that the major axis directions of the liquid crystal molecules are oriented parallel to the normal direction of the alignment layers 14A and 14B. Accordingly, the light control section 30 becomes transparent.

The light transmittance of the light control section 30 can be controlled to be transparent or opaque in two stages, or in three stages or more by controlling the voltage signal applied to the transparent electrode layers 12A and 12B. For example, the control unit 50 changes the light transmittance of each of the light control sections 30 in response to the signal from an external switch provided for each light control section 30 when the external switch is operated by the user of the light control device.

(Method of Producing Light Control Sheet)

A method of producing the light control sheet 10 will be described by using an example of the normal type light control sheet 10N.

Figure 6:
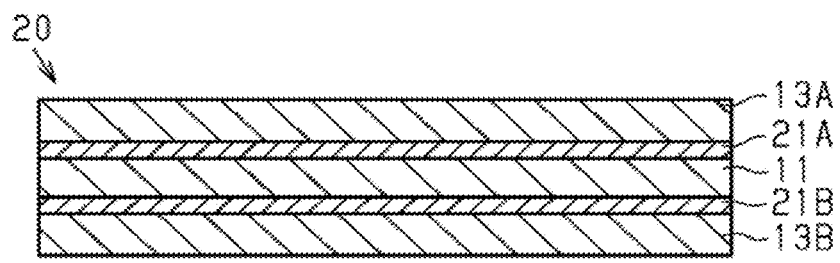
FIG. 6 is a view illustrating a step of production of a light control sheet according to an embodiment, showing a multilayer laminate formed.

As shown in FIG. 6, first, a multilayer laminate 20 including the light control layer 11, transparent conductive layers 21A and 21B, and the transparent support layers 13A and 13B is formed. The first transparent conductive layer 21A is supported by the first transparent support layer 13A, and the second transparent conductive layer 21B is supported by the second transparent support layer 13B. The first transparent conductive layer 21A and the second transparent conductive layer 21B sandwich the light control layer 11. The transparent conductive layers 21A and 21B are the transparent electrode layers 12A and 12B before the electrode sections 40 and 45 are formed, which are transparent uniform conductive films that do not have any insulating portions.

The multilayer laminate 20 is formed, for example, by cutting a large-sized sheet in which the light control layer 11, the transparent conductive layers 21A and 21B and the transparent support layers 13A and 13B are laminated into a desired shape according to a portion where the light control sheet 10 is to be attached.

The light control layer 11 contains a liquid crystal composition. The light control layer 11 is composed of, for example, a polymer network liquid crystal (PNLC), a polymer dispersed liquid crystal (PDLC), a nematic curvilinear aligned phase (NCAP) liquid crystal, or the like. For example, a polymer network liquid crystal has a three-dimensional mesh polymer network, and holds liquid crystal molecules in voids in the polymer network. The liquid crystal molecules contained in the light control layer 11 have, for example, positive dielectric anisotropy, and have a higher dielectric constant in a major axis direction of the liquid crystal molecules than in a minor axis direction of the liquid crystal molecules. These liquid crystal molecules are, for example, liquid crystal molecules based on a Schiff base, azo, azoxy, biphenyl, terphenyl, benzoic acid ester, tolan, pyrimidine, cyclohexanecarboxylic acid ester, phenylcyclohexane, or dioxane molecules.

The light control layer 11 may include a dye that has a predetermined color and does not hinder movement of the liquid crystal molecules according to a magnitude of the voltage applied to the light control layer 11. Such a configuration achieves a light control section 30 having a predetermined color.

Materials forming the transparent conductive layers 21A and 21B include, for example, polymers including indium tin oxide (ITO), fluorine-doped tin oxide (FTO), tin oxide, zinc oxide, carbon nanotube (CNT), or poly(3,4-ethylenedioxythiophene) (PEDOT), and multilayer films including Ag alloy thin films.

The first transparent support layer 13A and the second transparent support layer 13B are transparent substrates. Example of the transparent support layers 13A and 13B include a glass substrate, a silicon substrate, or a polymer film made of polyethylene, polystyrene, polyethylene terephthalate, polyvinyl alcohol, polycarbonate, polyvinyl chloride, polyimide, polysulfone, cycloolefin polymer, triacetylcellulose, or the like.

Then, the multilayer laminate 20 is irradiated with a laser beam to form the transparent electrode layers 12A and 12B. The following description will be given of laser irradiation modes, which include a first irradiation mode, a second irradiation mode, a third irradiation mode, and a fourth irradiation mode. The first irradiation mode and the second irradiation mode are irradiation modes for defining the transparent electrode layers 12A and 12B in the above first form, and the third irradiation mode and the fourth irradiation mode are irradiation modes for defining the transparent electrode layers 12A and 12B in the above second form.

Figure 7:
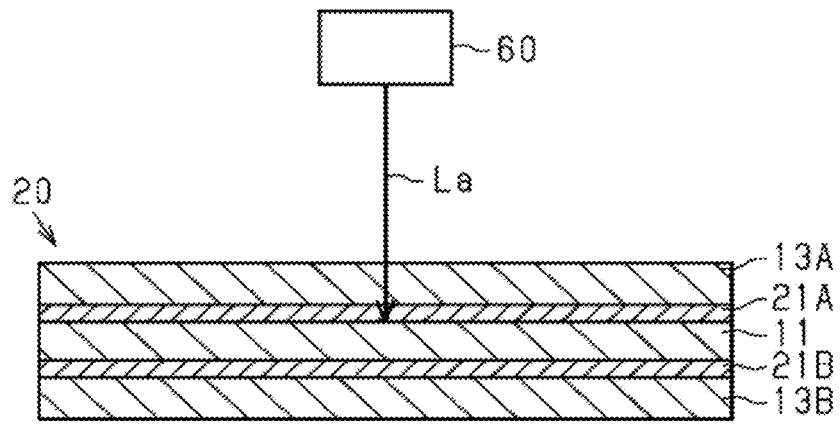
FIG. 7 is a view illustrating a step of production of a light control sheet according to an embodiment, showing laser irradiation in a first irradiation mode.

As shown in FIG. 7, in the first irradiation mode, the light control layer 11 is irradiated with the laser La via the first transparent conductive layer 21A so that a region where the boundary section 31 is to be formed in the multilayer laminate 20 is irradiated. By irradiation with the laser La, an insulating portion is formed in the first transparent conductive layer 21A, which is one of the two transparent conductive layers 21A and 21B located closer to a light source of the laser apparatus 60. As a result, an insulating section 41 and a plurality of electrode sections 40 divided by the insulating section 41 are formed in the first transparent conductive layer 21A. Thus, the first transparent electrode layer 12A is formed.

Specifically, the laser La is applied to the multilayer laminate 20 so as to penetrate the first transparent support layer 13A in a direction perpendicular to the first transparent support layer 13A, and is focused on or near the first transparent conductive layer 21A. While at least an outer surface of the first transparent support layer 13A is not modified by the laser La, an insulating portion is formed in the first transparent conductive layer 21A as the insulating section 41. On the other hand, an insulating portion is not formed in the second transparent conductive layer 21B, and thus the second transparent electrode layer 12B having no strip section 46 is formed.

Further, the insulating section 41 may also be formed in the first transparent conductive layer 21A by setting the focus of the laser La to a position beyond the first transparent conductive layer 21A as viewed from the light source of the laser apparatus 60, and setting the wavelength of the laser La so that it is absorbed by the first transparent conductive layer 21A.

Figure 8:
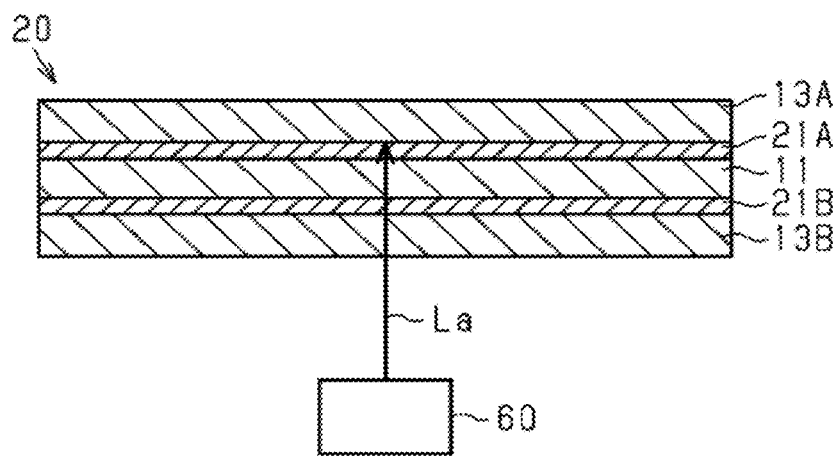
FIG. 8 is a view illustrating a step of production of a light control sheet according to an embodiment, showing laser irradiation in a second irradiation mode.

As shown in FIG. 8, in the second irradiation mode, the light control layer 11 is irradiated with the laser La via the second transparent conductive layer 21B so that a region where the boundary section 31 is to be formed in the multilayer laminate 20 is irradiated. By irradiation with the laser La, an insulating portion is formed in the first transparent conductive layer 21A, which is one of the two transparent conductive layers 21A and 21B located farther from a light source of the laser apparatus 60. As a result, an insulating section 41 and a plurality of electrode sections 40 divided by the insulating section 41 are formed in the first transparent conductive layer 21A. Thus, the first transparent electrode layer 12A is formed.

Specifically, the laser La is applied to the multilayer laminate 20 so as to penetrate the second transparent support layer 13B in a direction perpendicular to the second transparent support layer 13B, and is focused on or near the first transparent conductive layer 21A. The second transparent support layer 13B and the second transparent conductive layer 21B are not modified by the laser La, and the second transparent electrode layer 12B having no strip section 46 is formed. On the other hand, an insulating portion is formed in the first transparent conductive layer 21A as the insulating section 41.

Figure 9:
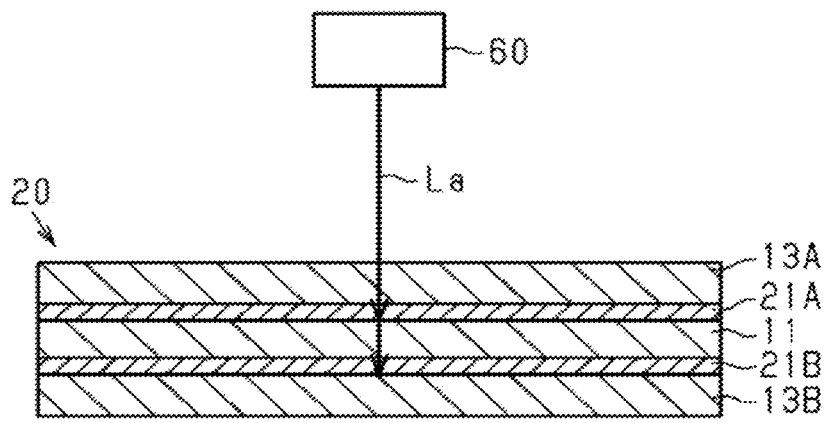
FIG. 9 is a view illustrating a step of production of a light control sheet according to an embodiment, showing laser irradiation in a third irradiation mode.

As shown in FIG. 9, in the third irradiation mode, the light control layer 11 is irradiated with the laser La via the first transparent conductive layer 21A so that a region where the boundary section 31 is to be formed in the multilayer laminate 20 is irradiated. By irradiation with the laser La, an insulating portion is formed in both the first transparent conductive layer 21A, which is one of the two transparent conductive layers 21A and 21B located closer to a light source of the laser apparatus 60, and the second transparent conductive layer 21B, which is located farther from the light source. As a result, an insulating section 41 and a plurality of electrode sections 40 divided by the insulating section 41 are formed in the first transparent conductive layer 21A. Thus, the first transparent electrode layer 12A is formed. Further, a strip section 46 and a plurality of electrode sections 45 divided by the strip section 46 are formed in the second transparent conductive layer 21B. Thus, the second transparent electrode layer 12B is formed.

Specifically, the laser La is applied to the multilayer laminate 20 so as to penetrate the first transparent support layer 13A in a direction perpendicular to the first transparent support layer 13A, and is focused on or near the first transparent conductive layer 21A. While at least an outer surface of the first transparent support layer 13A is not modified by the laser La, an insulating portion is formed in the first transparent conductive layer 21A as the insulating section 41. Further, as the laser La penetrates the first transparent conductive layer 21A and the light control layer 11, an insulating portion is formed in the second transparent conductive layer 21B as the strip section 46.

The laser La may also be focused on or near the second transparent conductive layer 21B. Further, the insulating section 41 and the strip section 46 may also be formed by setting the focus of the laser La to a position beyond the second transparent conductive layer 21B as viewed from the light source of the laser apparatus 60, and setting the wavelength of the laser La so that it is absorbed by the first transparent conductive layer 21A and the second transparent conductive layer 21B.

Figure 10:
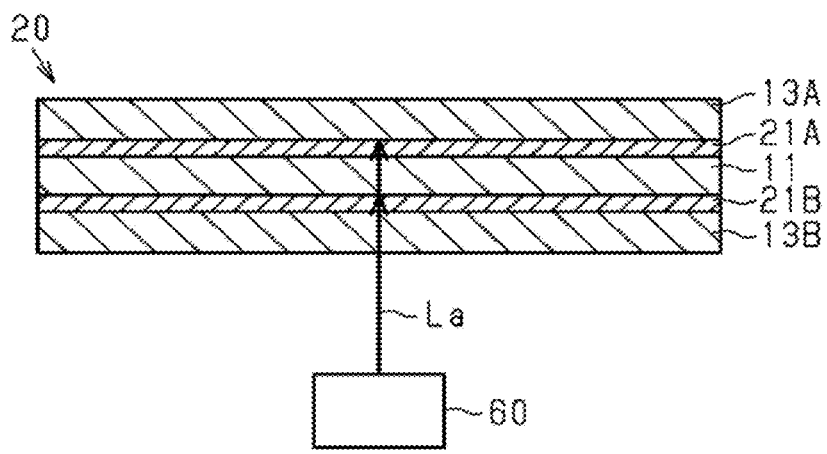
FIG. 10 is a view illustrating a step of production of a light control sheet according to an embodiment, showing laser irradiation in a fourth irradiation mode.

As shown in FIG. 10, in the fourth irradiation mode, the light control layer 11 is irradiated with the laser La via the second transparent conductive layer 21B so that a region where the boundary section 31 is to be formed in the multilayer laminate 20 is irradiated. By irradiation with the laser La, an insulating portion is formed in both the first transparent conductive layer 21A, which is one of the two transparent conductive layers 21A and 21B located farther from a light source of the laser apparatus 60, and the second transparent conductive layer 21B, which is located closer to the light source. As a result, an insulating section 41 and a plurality of electrode sections 40 divided by the insulating section 41 are formed in the first transparent conductive layer 21A. Thus, the first transparent electrode layer 12A is formed. Further, a strip section 46 and a plurality of electrode sections 45 divided by the strip section 46 are formed in the second transparent conductive layer 21B. Thus, the second transparent electrode layer 12B is formed.

Specifically, the laser La is applied to the multilayer laminate 20 so as to penetrate the second transparent support layer 13B in a direction perpendicular to the second transparent support layer 13B, and is focused on or near the first transparent conductive layer 21A. While at least an outer surface of the second transparent support layer 13B is not modified by the laser La, an insulating portion is formed in the second transparent conductive layer 21B as the strip section 46. Further, as the laser La penetrates the second transparent conductive layer 21B and the light control layer 11, an insulating portion is formed in the first transparent conductive layer 21A as the insulating section 41.

The laser La may also be focused on or near the second transparent conductive layer 21B. Further, the insulating section 41 and the strip section 46 may also be formed by setting the focus of the laser La to a position beyond the first transparent conductive layer 21A as viewed from the light source of the laser apparatus 60, and setting the wavelength of the laser La so that it is absorbed by the first transparent conductive layer 21A and the second transparent conductive layer 21B.

Difference between the first irradiation mode and the third irradiation mode and difference between the second irradiation mode and the fourth irradiation mode, that is, whether the second transparent conductive layer 21B is processed as with the first transparent conductive layer 21A, can be controlled by adjusting the power of the laser La and the focus position. Further, an area of the insulating portion in the strip section 46 formed in the third irradiation mode and the fourth irradiation mode can also be modified by adjusting the power of the laser La and the focus position.

The medium and wavelength of laser used for the laser irradiation is not specifically limited. Examples of a laser that can be used include a Nd:YAG laser, Nd:YVO$_4$ laser, CO$_2$ laser, and semiconductor laser. For example, the infrared wavelength is used for the laser wavelength. The laser may be a continuous-wave laser or a pulsed laser.

After the laser irradiation, regions intended for the terminal sections 15A and 15B are formed, and then the terminal sections 15A and 15B are disposed. Thus, the light control sheet 10 is formed. The terminal sections 15A and 15B are formed of, for example, conductive tapes, conductive pastes, conductive films, or other conductive materials. Formation of the regions intended for the terminal sections 15A and 15B and arrangement of the terminal sections 15A are 15B may also be performed before the laser irradiation.

Further, in production of the reverse type light control sheet 10R, a multilayer laminate including the alignment layers 14A and 14B in addition to the light control layer 11, the transparent conductive layers 21A and 21B, and the transparent support layers 13A and 13B may be used as the multilayer laminate 20. The first alignment layer 14A is interposed between the light control layer 11 and the first transparent conductive layer 21A, and the second alignment layer 14B is interposed between the light control layer 11 and the second transparent conductive layer 21B.

Materials for forming the alignment layers 14A and 14B are, for example, polyesters such as polyamide, polyimide, polycarbonate, polystyrene, polysiloxane, polyethylene terephthalate, and polyethylene naphthalate, and polyacrylates such as polymethylmethacrylate. Examples of alignment processing for the alignment layers 14A and 14B include rubbing, polarized light irradiation, and microprocessing.

The multilayer laminate 20 including the alignment layers 14A and 14B is irradiated with a laser beam in any of the above four irradiation modes. Accordingly, as in the normal type, the first transparent electrode layer 12A and the second transparent electrode layer 12B are formed.

According to the production method of the present embodiment, since the first transparent electrode layer 12A is patterned by laser irradiation for forming the insulating section 41, it is possible to reduce the number of steps and the time required for producing the light control sheet 10 compared with the production method in which patterning is performed by photolithography and etching. Further, compared with the production method in which patterning is performed by photolithography and etching, the manufacturing cost can also be reduced. In addition, compared with the insulating section formed by photolithography and etching, the insulating section 41 formed by laser irradiation can be less conspicuous. Accordingly, the boundary section 31 between the adjacent light control sections 30 can be prevented from being conspicuous. Further, since the first transparent electrode layer 12A is patterned after the multilayer laminate 20 is formed, it is possible to easily cope with design change in the shape of the light control sheet 10, the electrode section 40, or the like.

In addition to the light control layer 11, the transparent electrode layers 12A and 12B, the transparent support layers 13A and 13B, and the alignment layers 14A and 14B, the light control sheet 10 may include one or more additional layers. Examples of the additional layers include layers having a UV barrier function or the like, layers for protecting the light control layer 11 and the transparent electrode layers 12A and 12B, layers contributing to control of optical transparency of the light control section 30, and layers improving strength or characteristics such as heat resistance of the light control sheet 10. In the case as well where the light control sheet 10 includes one or more additional layers, laser irradiation is performed to the multilayer laminate 20, having a layer configuration corresponding to the layer configuration of the light control sheet 10, to form the first transparent electrode layer 12A and the second transparent electrode layer 12B.

(Configuration of Light Control Sheet)

Detailed configuration of the light control sheet 10 formed by the above production method will now be described, focusing on the configuration of the boundary section 31. As described above, the insulating section 41 of the first transparent electrode layer 12A is a laser-processed region formed by laser irradiation. First, the details of the laser-processed region will be described.

Figure 11:
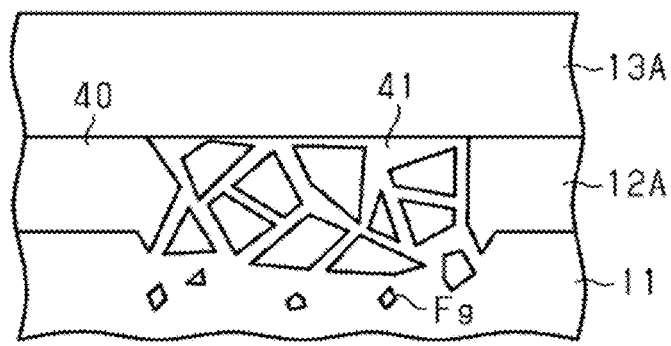
FIG. 11 is a view illustrating a first example of a configuration of an insulating section in a light control sheet of an embodiment.
Figure 12:
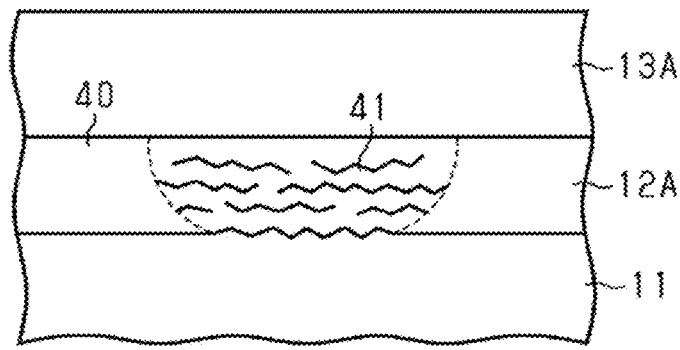
FIG. 12 is a view illustrating a first example of a configuration of an insulating section in a light control sheet of an embodiment.

FIGS. 11 and 12 are enlarged views of a first example of the cross-sectional structure near the insulating section 41. In the first example, the insulating section 41 is a portion in which the conductive film constituting the first transparent conductive layer 21A is broken into small pieces. As shown in FIG. 11, in the insulating section 41, the conductive film is broken into pieces by laser irradiation, and part of the first transparent conductive layer 21A is removed from the first transparent support layer 13A. That is, the insulating section 41 is a portion in which the conductive film is removed from the first transparent support layer 13A.

A fragment Fg of the conductive film removed from the first transparent support layer 13A is located near the insulating section 41 in the functional layer such as the light control layer 11 or the first alignment layer 14A in contact with the first transparent electrode layer 12A. Therefore, the content of the element constituting the electrode section 40 is higher in a portion of the functional layer in contact with the insulating section 41 than in a portion in contact with the electrode section 40.

Further, depending on the degree of fragmentation of the conductive film due to the laser irradiation, the insulating section 41 may be a portion in which the conductive film is physically broken while being in contact with the first transparent support layer 13A as shown in FIG. 12. The surface of the insulating section 41 is rougher than the surface of the electrode section 40. In this case, the fragment Fg is not dispersed into the functional layer.

Figure 13:
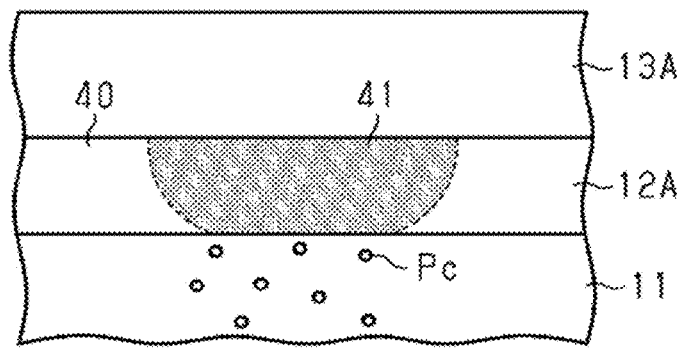
FIG. 13 is a view illustrating a second example of a configuration of an insulating section in a light control sheet of an embodiment.
Figure 14:
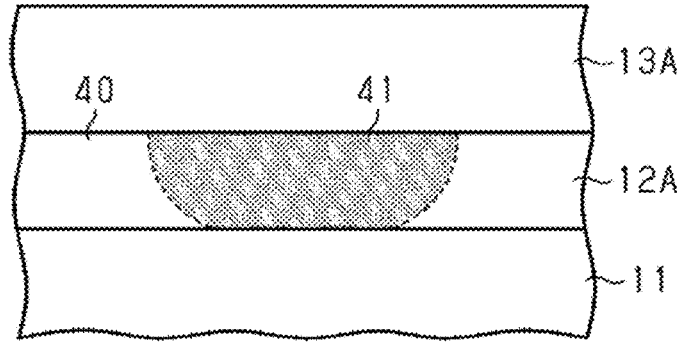
FIG. 14 is a view illustrating a second example of a configuration of an insulating section in a light control sheet of an embodiment.

FIGS. 13 and 14 are enlarged views of a second example of the cross-sectional structure near the insulating section 41. In the second example, the insulating section 41 is a region chemically modified by laser irradiation.

For example, as shown in FIG. 13, the insulating section 41 is a region whose composition is modified from the electrode section 40 due to migration of an element Pc, which is part of the atoms contributing to electrical conductivity or the molecules contributing to electrical conductivity, into a layer underlying the first transparent electrode layer 12A. Such a modification in composition imparts insulating properties to the insulating section 41.

The content of the element Pc is higher in a portion of the functional layer such as the light control layer 11 or the first alignment layer 14A in contact with the first transparent electrode layer 12A than in a portion of the functional layer in contact with the electrode section 40.

The insulating section 41 and the electrode section 40 adjacent to the insulating section 41 form a single continuous layer, and the first transparent electrode layer 12A has a flat film shape. However, the insulating section 41 is more fragile than the electrode section 40 since the element Pc has been lost. For example, the surface of the insulating section 41 is rougher than the surface of the electrode section 40.

Further, for example as shown in FIG. 14, the insulating section 41 is a region different from the electrode section 40 in that the atomic positions in the compound have been displaced or the chemical structure has changed due to breakage of bonds in molecules or the like. Such a change in chemical structure imparts insulating properties to the insulating section 41. In the insulating section 41, the composition is not modified. The insulating section 41 and the electrode section 40 adjacent to the insulating section 41 form a single continuous layer, and the first transparent electrode layer 12A has a flat film shape.

Whether the insulating section 41 has a structure of the first example or the second example depends on the material constituting the first transparent electrode layer 12A, that is, the material constituting the first transparent conductive layer 21A, the power of laser, and the like. Further, the insulating section 41 may have a structure in which the first example and the second example are combined. For example, the first transparent electrode layer 12A may have a structure in which the element Pc migrates from the insulating section 41 into a layer underlying the first transparent electrode layer 12A while the conductive film is physically broken. The element Pc is an element included in a plurality of elements constituting the electrode section 40.

Further, when the second transparent electrode layer 12B includes the strip section 46, an insulating portion of the strip section 46 has the same structure as that of the insulating section 41 of the first example, the second example, or a combination thereof.

In FIGS. 12 to 14, the cross-sectional shape of the insulating section 41 is shown such that the length of the insulating section 41 in the width direction increases toward the first transparent support layer 13A, and the outer shape of the insulating section 41 has a curve bulging outward. This shape is on the assumption that the insulating section 41 is formed by laser irradiation of the first irradiation mode or the third irradiation mode, in which the laser is focused on a region from that in proximity to the center part of the first transparent conductive layer 21A to the surface in contact with the first transparent support layer 13A. The cross-sectional shape of the insulating section 41 may be different from the shapes shown in FIGS. 12 to 14 depending on the laser focusing position, laser power, or the like.

Figure 15:
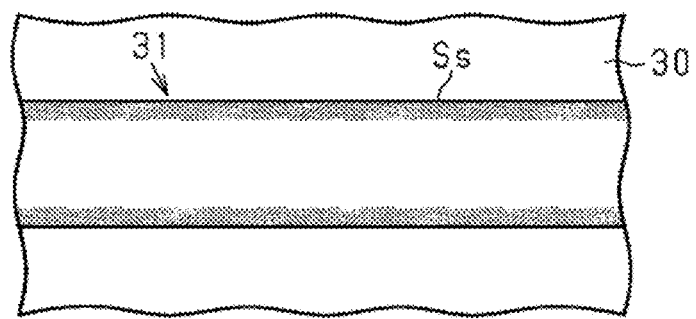
FIG. 15 is a view illustrating an example of an appearance of a boundary section in a light control sheet of an embodiment.

Next, an appearance of the insulating section 41 will be described below. FIG. 15 is an enlarged view of an example of a planar structure near the boundary section 31 in the light control sheet 10. When viewed in a direction perpendicular to a surface of the light control sheet 10, that is, in a direction perpendicular to the first transparent support layer 13A, the boundary section 31 in which the insulating section 41 is located has a straight strip-shaped region Ss, which is a strip-shaped region having a constant width. The boundary section 31 having the straight strip-shaped region Ss is formed by a continuous-wave laser.

At least part of the straight strip-shaped region Ss is discolored and appears dull. Accordingly, the visible light transmittance of the boundary section 31 is lower than that of the light control section 30 in a transparent state. FIG. 15 shows an example in which end portions of the straight strip-shaped region Ss in the width direction are discolored.

The degree of discoloration varies in the straight strip-shaped region Ss, since the farther from the center on which the laser is focused, the lower the energy of the laser received by the multilayer laminate 20. According to the power of the laser, a portion where discoloration occurs in the straight strip-shaped region Ss can vary. For example, a center part of the straight strip-shaped region Ss in the width direction may be discolored, or end portions in the width direction and a center part may be discolored.

One of the reasons of discoloration is, for example, when the first transparent support layer 13A is a polyethylene terephthalate film or the like, a portion of the first transparent support layer 13A in contact with the insulating section 41 becomes amorphous due to laser irradiation. Such a change into an amorphous state in the first transparent support layer 13A is particularly likely to occur in a center part of the straight strip-shaped region Ss in the width direction.

Whether a change into an amorphous state occurs or not in the first transparent support layer 13A can be controlled by the power of laser, focus position, and the like. The laser irradiation conditions can be adjusted to cause or not to cause a change into an amorphous state in the first transparent support layer 13A depending on whether the boundary section 31 is desired to appear more clearly or not.

Further, the boundary section 31 may have a configuration in which a plurality of straight strip-shaped regions Ss are arranged side by side in the width direction of the straight strip-shaped region Ss. The boundary section 31 formed of a plurality of straight strip-shaped regions Ss is formed by scanning a laser a plurality of times to a region where the boundary section 31 is to be formed while gradually offsetting the irradiation position in the width direction. When the boundary section 31 is formed of a plurality of straight strip-shaped regions Ss, the insulating properties of the insulating section 41 between the electrode sections 40 are enhanced.

Figure 16:
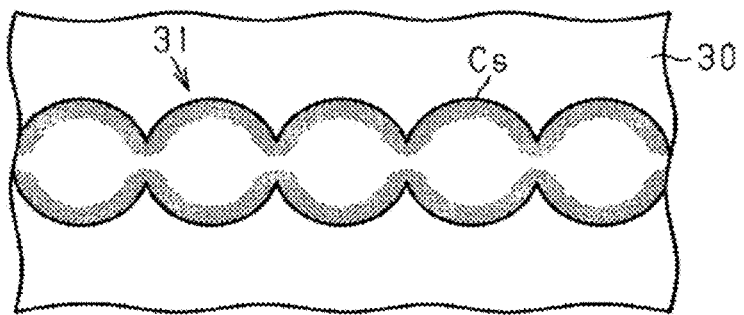
FIG. 16 is a view illustrating another example of an appearance of a boundary section in a light control sheet of an embodiment.
Figure 17:
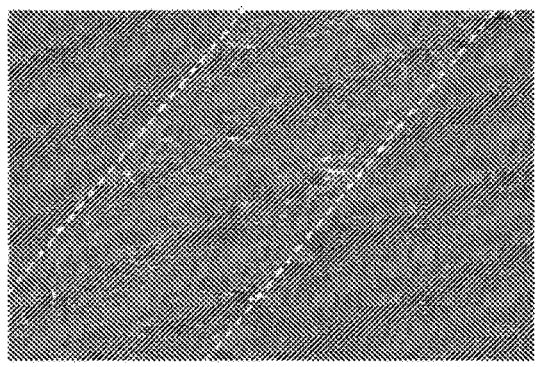
FIG. 17($a$) is an SEM image of a surface of a light control layer in a laminate obtained by dividing a light control sheet of an example, and FIG. 17($b$), FIG. 17($c$), and FIG. 17($d$) are views showing EDX mapping results in a region included in FIG. 17($a$).
Figure 17:
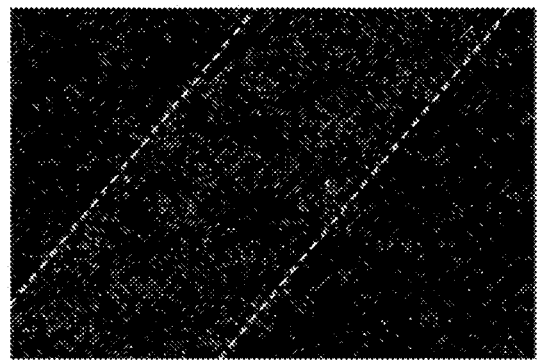
Figure 17:
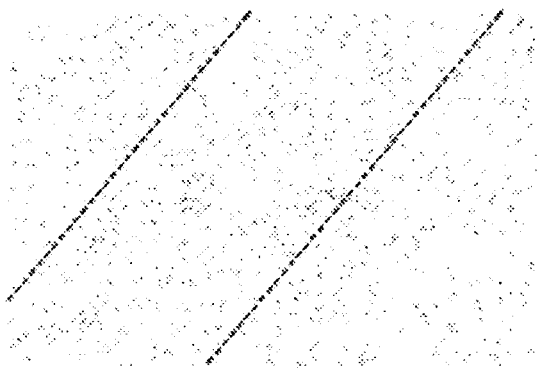
Figure 17:
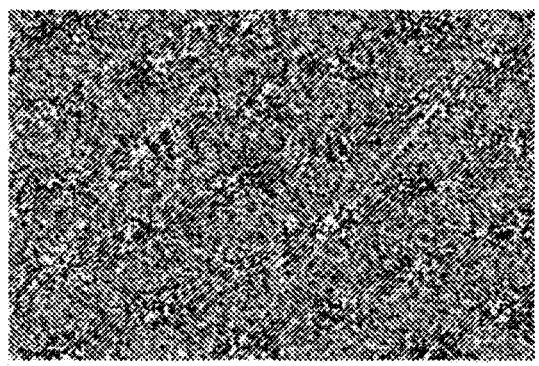
Figure 18:
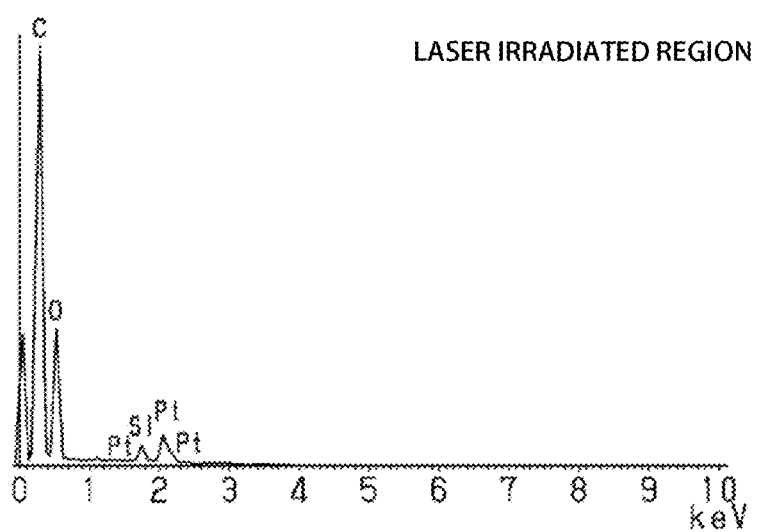
FIGS. 18(*a*), 18(*b*), and 18(*c*) are EDX spectra of a laminate obtained by dividing a light control sheet of an example.
Figure 18:
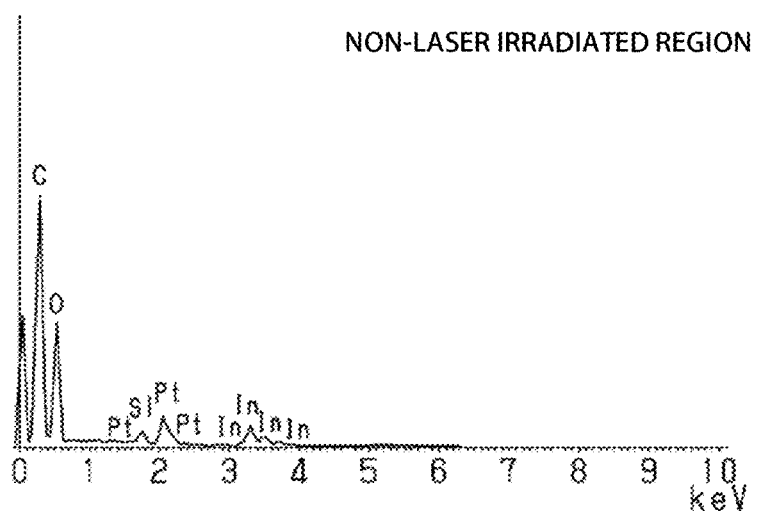
Figure 18:
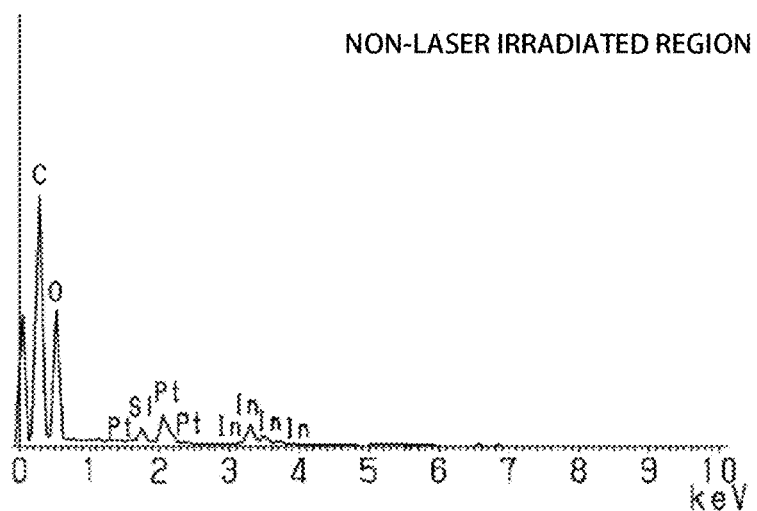

FIG. 16 is an enlarged view of another example of a planar structure near the boundary section 31 in the light control sheet 10. When viewed in a direction perpendicular to a surface of the light control sheet 10, the boundary section 31 is formed as a rounded strip-shaped region Cs having an outer shape formed of a sequence of rounded regions arranged in one direction. Specifically, the rounded strip-shaped region Cs has an outer shape formed of a sequence of rounded regions communicating with each other. The boundary section 31 having the rounded strip-shaped region Cs is formed by a pulsed laser.

At least part of the rounded strip-shaped region Cs is discolored and appears dull. Accordingly, the visible light transmittance of the boundary section 31 is lower than that of the light control section 30 in a transparent state. FIG. 16 shows an example in which end portions of the rounded strip-shaped region Cs in the width direction, that is, a circumferential portion of the rounded regions connected to each other is discolored.

The degree of discoloration varies in the rounded strip-shaped region Cs, since the farther from the center on which the laser is focused, the lower the laser energy received by the multilayer laminate 20. According to the power of the laser, a portion where discoloration occurs in the rounded strip-shaped region Cs can vary. For example, a center part of the rounded regions of the rounded strip-shaped region Cs may be discolored, or a circumferential portion and a center part of the rounded regions may be discolored.

One of the reasons of discoloration is, as in the case of the straight strip-shaped region Ss, a portion of the first transparent support layer 13A in contact with the insulating section 41 becomes amorphous due to laser irradiation. Such a change into an amorphous state in the first transparent support layer 13A is particularly likely to occur in a center part of the rounded regions of the rounded strip-shaped region Cs. As in the case of the straight strip-shaped region Ss, whether a change into an amorphous state occurs or not in the first transparent support layer 13A can be controlled by the power of laser, focus position, and the like.

When the insulating section 41 is formed by using a continuous-wave laser, the multilayer laminate 20 is continuously irradiated with a laser beam, so the heat generated by laser irradiation is not likely to dissipate. As a result, liquid crystals contained in the light control layer 11 may change into gas, generating air bubbles. On the other hand, when a pulse laser is used, the multilayer laminate 20 is intermittently irradiated with a laser beam. Accordingly, the heat generated by laser irradiation is more likely to dissipate compared with a case using a continuous-wave laser. Accordingly, occurrence of air bubbles in the light control layer 11 can be reduced.

Further, the boundary section 31 may have a configuration in which a plurality of rounded strip-shaped regions Cs are arranged side by side in the width direction of the rounded strip-shaped region Cs. The boundary section 31 formed of a plurality of rounded strip-shaped regions Cs is formed by scanning a laser a plurality of times to a region where the boundary section 31 is to be formed while gradually offsetting the irradiation position in the width direction. When the boundary section 31 is formed of a plurality of rounded strip-shaped regions Cs, the insulating properties of the insulating section 41 between the electrode sections 40 are enhanced. In particular, when a pulsed laser is used, the width of the strip-shaped region, that is, the width of the insulating portion tends to have an irregular shape compared with a case using a continuous-wave laser. Accordingly, arranging a plurality of rounded strip-shaped regions Cs side by side is advantageous for improved reliability of the insulating properties.

Further, when the second transparent electrode layer 12B includes the strip section 46, the insulating section 41 overlaps the strip section 46 when the boundary section 31 is viewed in the direction perpendicular to a surface of the light control sheet 10. In this case as well, the boundary section 31 is formed of the straight strip-shaped region Ss or the rounded strip-shaped region Cs, and the visible light transmittance of the boundary section 31 is lower than that of the light control section 30 in a transparent state. Regardless of whether the second transparent electrode layer 12B includes the strip section 46 or not, the degree of discoloration of the strip-shaped regions Ss and Cs may vary, but the outer shape does not significantly vary when viewed in the direction perpendicular to a surface of the light control sheet 10.

(Analysis of Laser Irradiated Region in ITO Layer)

Analysis was performed for the insulating section 41 formed by laser irradiation to the reverse type multilayer laminate 20 having the transparent conductive layers 21A and 21B made of ITO. The transparent support layers 13A and 13B were made of a polyethylene terephthalate film, and the light control layer 11 was made of a polymer network liquid crystal. Further, as a material for the alignment layers 14A and 14B, polyimide was used.

<Laser Irradiation Conditions>

Type: IR semiconductor laser
Spot diameter: 30 μm
Laser type: pulsed laser
Repetition frequency: 1.2 kHz
Pulse width: 417 μs
Output: 0.008 W
Movement speed of a table on which the multilayer laminate 20 is placed: 30 mm/s <Analysis Procedure>

According to the above laser irradiation conditions, the multilayer laminate 20 was irradiated with a laser in the third irradiation mode with the laser wavelength set to be absorbed by the ITO to form a reverse type light control sheet 10R. The light control layer 11 was divided in the thickness direction so that the light control sheet 10R is separated into a first laminate having the first transparent support layer 13A, the first transparent electrode layer 12A, the first alignment layer 14A, and part of the light control layer 11, and a second laminate having the second transparent support layer 13B, the second transparent electrode layer 12B, the second alignment layer 14B, and part of the light control layer 11.

The first laminate and the second laminate were observed by using a scanning electron microscope (SEM) and analyzed by energy dispersive X-ray spectrometry (EDX). As the scanning electron microscope, a JSM-7001F manufactured by JEOL Ltd. was used. Further, in the EDX analysis, measurement was performed in a direction perpendicular to the horizontal plane while a surface of the laminate was inclined by 30° relative to the horizontal plane in order to ensure the layer thickness of the analysis target.

<Analysis Result>

The appearance and composition of the first laminate and the second laminate were analyzed according to the above procedure, and it was confirmed that the insulating section 41 formed according to the above laser irradiation conditions had a structure of the first example. The analysis result will be described in detail below.

FIG. 17(a) is an SEM image of the first laminate on a side on which a surface of the light control layer 11 is located. FIGS. 17(b) to 17(d) are views showing the EDX mapping result of a region included in the image of FIG. 17(a). FIG. 17(b) shows the distribution of indium (In), FIG. 17(c) shows the distribution of carbon (C), and FIG. 17(d) shows the distribution of oxygen (O). In the figures, a region sandwiched by two dotted lines is a region which has been irradiated with the laser, and a region outside the two dotted lines is a region which has not been irradiated with the laser.

As shown in FIG. 17(a), the first laminate has a rougher surface in the laser irradiated region than in the non-laser irradiated region.

As shown in FIG. 17(b), In concentration in the light control layer 11 and the first alignment layer 14A is higher in the laser irradiated region than in the non-laser irradiated region. It seems that the reason why In is detected in the non-laser irradiated region is because the In included in the first transparent electrode layer 12A underlying the light control layer 11 is detected.

As shown in FIGS. 17(c) and 17(d), distributions of C and O are not significantly different between the laser irradiated region and the non-laser irradiated region.

Accordingly, it is suggested that In, which is an element included in the first transparent electrode layer 12A, has migrated into the light control layer 11 in the laser irradiated region. From the observation result of the appearance of the first transparent electrode layer 12A described later, it seems that an increase of In in the laser irradiated region has occurred since the ITO film constituting the first transparent conductive layer 21A was removed from the first transparent support layer 13A when irradiated with the laser, and the fragments were dispersed into the light control layer 11.

FIGS. 18(a) to 18(c) show the EDX spectra measured for the points included in the laser irradiated region and the points included in two non-laser irradiated regions located on both sides of the laser irradiated region in the first laminate after the light control layer 11 and the first alignment layer 14A are wiped off by using methyl ethyl ketone. FIG. 18(a) shows the EDX spectra in the laser irradiated region, and FIGS. 18(b) and 18(c) show the EDX spectra in the non-laser irradiated region.

As shown in FIG. 18(a), In is not detected in the laser irradiated region. On the other hand, as shown in FIGS. 18(b) and 18(c), In is detected in the non-laser irradiated region. This indicates that while an ITO film is present in the non-laser irradiated region in the first transparent electrode layer 12A, the ITO film is damaged in the laser irradiated region. That is, it seems that an ITO film was broken by laser in the laser irradiated region, and the ITO fragments film were scattered outside the first transparent electrode layer 12A. Further, the detected Pt is derived from the coating applied to the sample as pretreatment.

Figure 19:
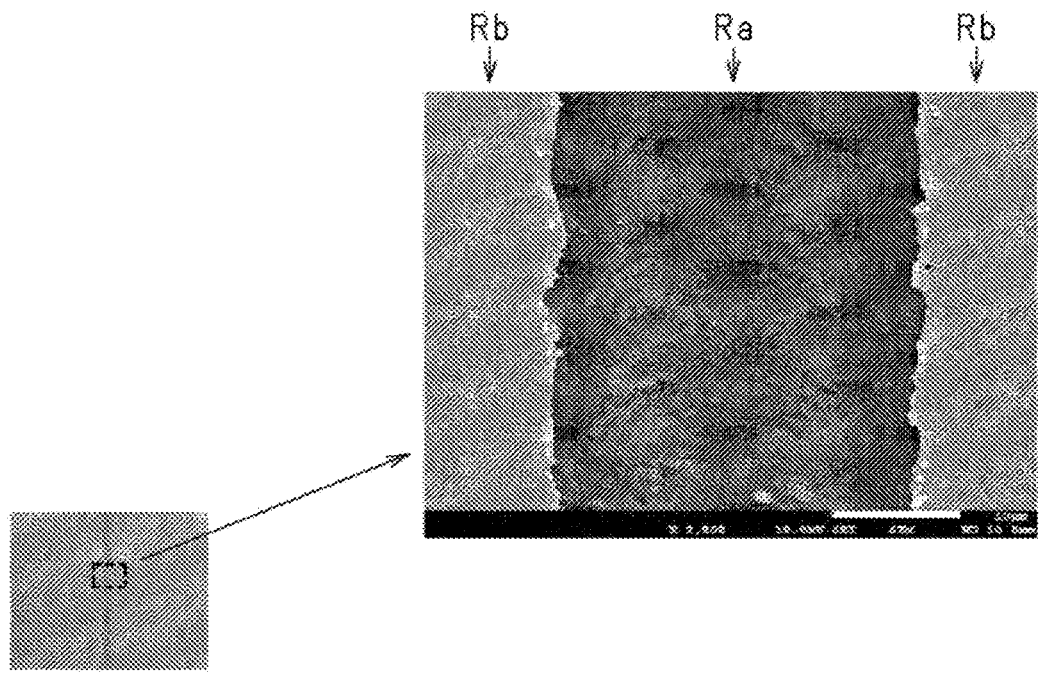
FIG. 19 is an SEM image of a region near an insulating section in a laminate obtained by dividing a light control sheet of an example.
Figure 20:
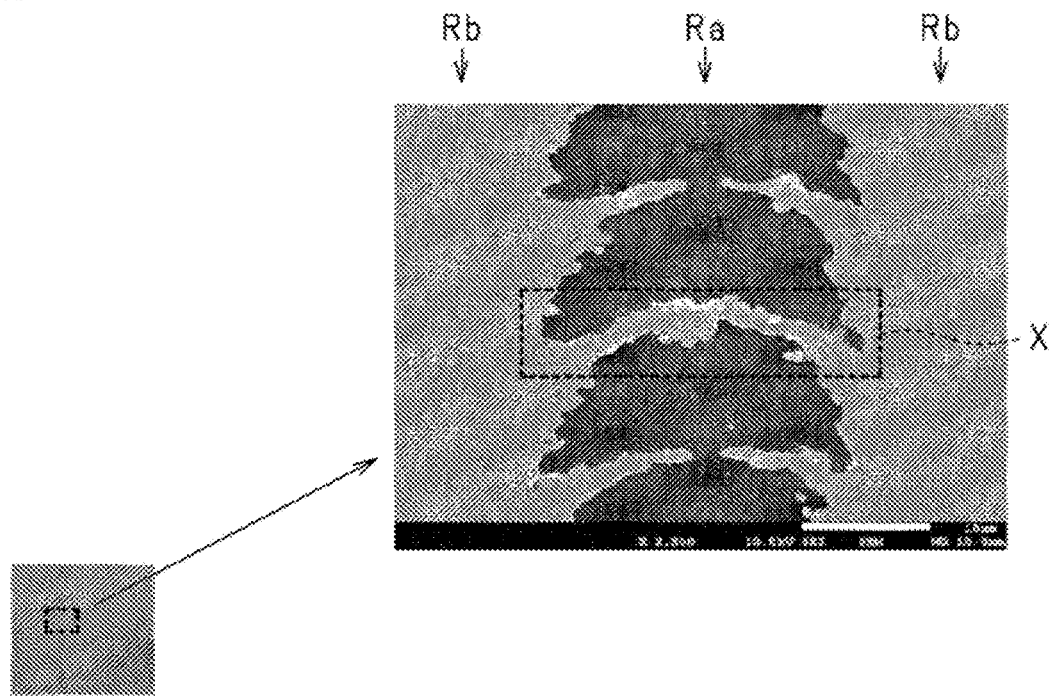
FIG. 20 is an SEM image of a region near a strip section in a laminate obtained by dividing a light control sheet of an example.

FIG. 19 is an SEM image of a surface of the first laminate after the light control layer 11 and the first alignment layer 14A are wiped off by using methyl ethyl ketone. FIG. 20 is an SEM image of a surface of the second laminate after the light control layer 11 and the second alignment layer 14B are wiped off by using methyl ethyl ketone. In FIGS. 19 and 20, a region Ra is a region which has been irradiated with a laser, and a region Rb is a region which has not been irradiated with a laser.

As seen from FIGS. 19 and 20, the ITO film is damaged in the laser irradiated region. In comparison between FIG. 19 and FIG. 20, it is found that a region damaged by laser irradiation is larger in the first transparent electrode layer 12A, which is located closer to the laser light source than in the second transparent electrode layer 12B, which is located farther from the laser light source. This indicates that more energy is imparted to the layer located closer to the light source by laser irradiation. Further, in FIG. 19, a region having the damaged ITO film in the first transparent electrode layer 12A has a width of approximately 30 µm. In FIG. 20, a region having the damaged ITO film in the second transparent electrode layer 12B has a width of approximately 25 µm.

As shown in FIG. 20, in the second transparent electrode layer 12B located farther from the light source, there is a region X, which is a portion of an ITO film extending from the non-laser irradiated region remains connected in the laser irradiated region. That is, in the second transparent electrode layer 12B shown in FIG. 20, portions damaged by laser irradiation are intermittently arranged. The strip section 46 formed in such a second transparent electrode layer 12B has a configuration in which insulating portions are intermittently arranged in the extending direction of the strip section 46.

From the analysis described above, it seems that when the transparent conductive layers 21A and 21B are made of ITO, in other words, when the electrode sections 40 and 45 of the transparent electrode layers 12A and 12B, respectively, are made of ITO, the insulating section 41 formed in the above laser irradiation conditions has a structure of the first example. That is, in the insulating section 41, a physical structure of the first transparent conductive layer 21A is damaged, the conductive film is removed from the first transparent support layer 13A, and the fragments of the conductive film are dispersed into the light control layer 11.

Figure 21:
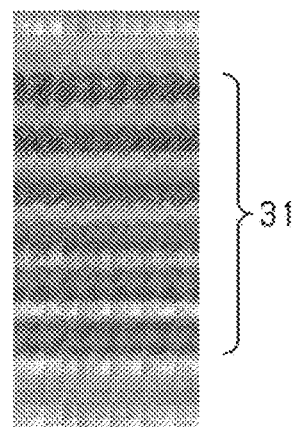
FIG. 21 is a stereoscopic microscope image of a boundary section in a light control sheet of an example.

FIG. 21 is a stereoscopic microscope image of the reverse type light control sheet 10R formed by laser irradiation in the third irradiation mode in the above laser irradiation conditions as viewed in a direction perpendicular to the first transparent support layer 13A.

As seen from FIG. 21, the boundary section 31 is formed as a rounded strip-shaped region Cs having an outer shape formed of a sequence of rounded regions. Further, the boundary section 31 appears dull compared with the light control section 30, suggesting that the visible light transmittance of the boundary section 31 is lower than that of the light control section 30. Further, when only the first transparent support layer 13A is observed, cloudiness due to a change into an amorphous state was observed on a surface in contact with the first transparent electrode layer 12A in the laser irradiated region.

(Other Forms of Light Control Device)

The form of division of the electrode section in the light control sheet 10 described above includes the form in which only the first transparent electrode layer 12A is divided, and the form in which the first transparent electrode layer 12A and the second transparent electrode layer 12B are divided into the same pattern. These forms are merely examples, and the first transparent electrode layer 12A and the second transparent electrode layer 12B may also be divided into different patterns. For example, a form in which the light control sheet includes the light control sections 30 arranged in a matrix will be described below.

Figure 22:
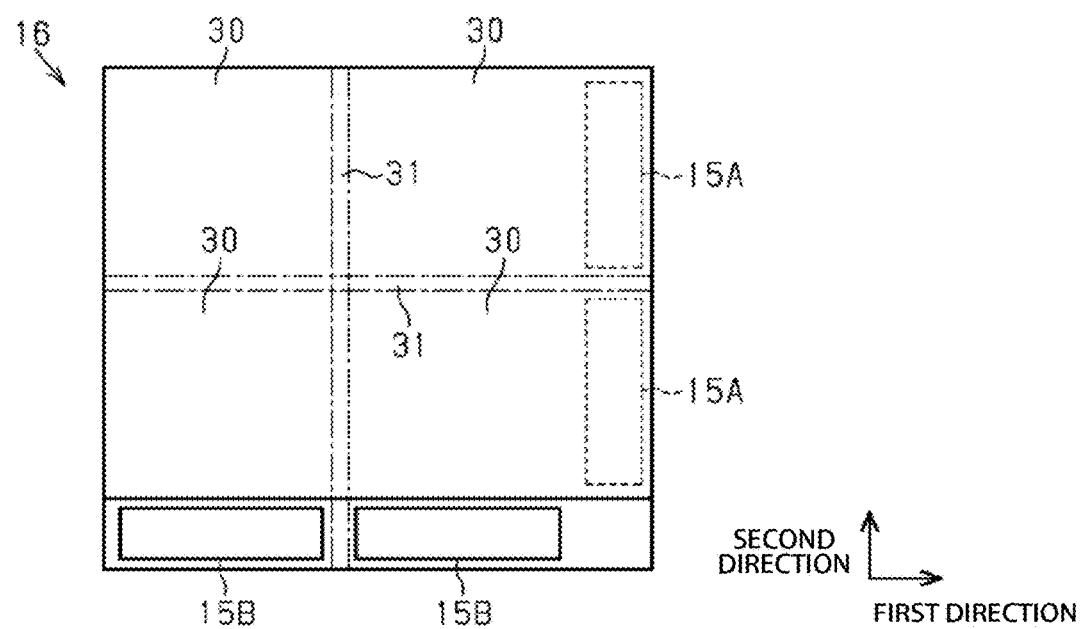
FIG. 22 is a view illustrating a planar structure of a light control sheet of a modified example.

As shown in FIG. 22, the light control sheet 16 includes a plurality of light control sections 30 arranged in a first direction and a second direction, which are two orthogonal directions, when viewed in a direction perpendicular to a surface of the light control sheet 16. That is, the plurality of light control sections 30 are arranged in a matrix. The boundary section 31 extending linearly is located between the light control sections 30 adjacent to each other.

Figure 23:
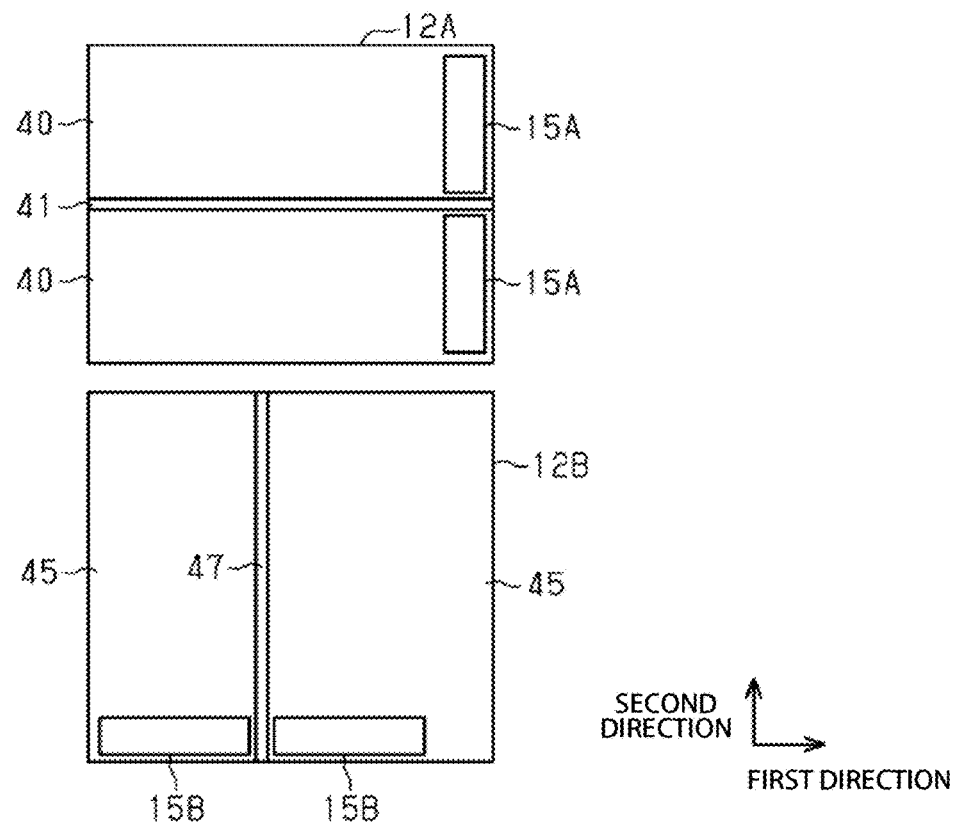
FIG. 23 is a view illustrating a planar structure of transparent electrode layer in a light control sheet of a modified example.

As shown in FIG. 23, the first transparent electrode layer 12A includes a plurality of electrode sections 40 each extending in the first direction, which are arranged side by side in the second direction, and the insulating section 41 located between the electrode sections 40 adjacent to each other. The adjacent electrode sections 40 are insulated from each other by the insulating section 41.

The first terminal section 15A is provided for each of the electrode sections 40. Different voltage signals are supplied from the control unit 50 to each of the plurality of electrode sections 40.

On the other hand, the second transparent electrode layer 12B includes a plurality of electrode sections 45 each extending in the second direction, which are arranged side by side in the second direction, and the insulating section 47 located between the electrode sections 45 adjacent to each other. The insulating section 47 has a configuration in which insulating portions are continuously arranged in the extending direction of the insulating section 47. The adjacent electrode sections 45 are insulated from each other by the insulating section 47.

The second terminal section 15B is provided for each of the electrode sections 45. Different voltage signals are supplied from the control unit 50 to each of the plurality of electrode sections 45.

When viewed in the direction perpendicular to a surface of the light control sheet 16, a region where the electrode section 40 of the first transparent electrode layer 12A overlaps the electrode section 45 of the second transparent electrode layer 12B is the light control section 30. Further, when viewed in the direction perpendicular to a surface of the light control sheet 16, a region where at least one of the insulating section 41 of the first transparent electrode layer 12A and the insulating section 47 of the second transparent electrode layer 12B is located is the boundary section 31.

The control unit 50 supplies different voltage signals to each of the electrode sections 40 in the first transparent electrode layer 12A, and supplies different voltage signals to each of the electrode sections 45 in the second transparent electrode layer 12B. Accordingly, the potential difference between the first transparent electrode layer 12A and the second transparent electrode layer 12B in each light control section 30 is controlled, and thus the light transmittance of each light control section 30 is controlled.

In production of the above light control sheet 16, the insulating section 41 of the first transparent electrode layer 12A and the insulating section 47 of the second transparent electrode layer 12B are separately formed. For example, in laser irradiation to the multilayer laminate 20, the light control layer 11 is irradiated with the laser via the first transparent conductive layer 21A to form an insulating section 41 in the first transparent conductive layer 21A, and the light control layer 11 is irradiated with laser via the second transparent conductive layer 21B to form the insulating section 47 in the second transparent conductive layer 21B.

Figure 24:
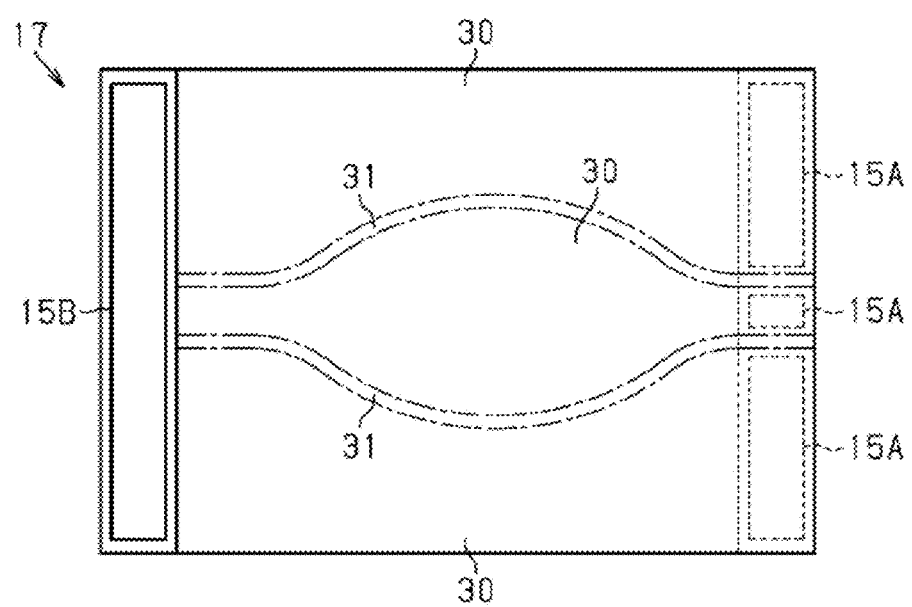
FIG. 24 is a view illustrating a planar structure of a light control sheet of a modified example.

Further, the light control section 30 is not limited to a strip shape and may have any shape. The boundary section 31 is not limited to a straight shape and may have a curved shape. An example is shown in FIG. 24 as a light control sheet 17, in which the boundary section 31 has a curved shape and the light control section 30 has a non-constant width. Further, the shape and area of the light control section 30 may be different for each of the light control sections 30.

Figure 25:
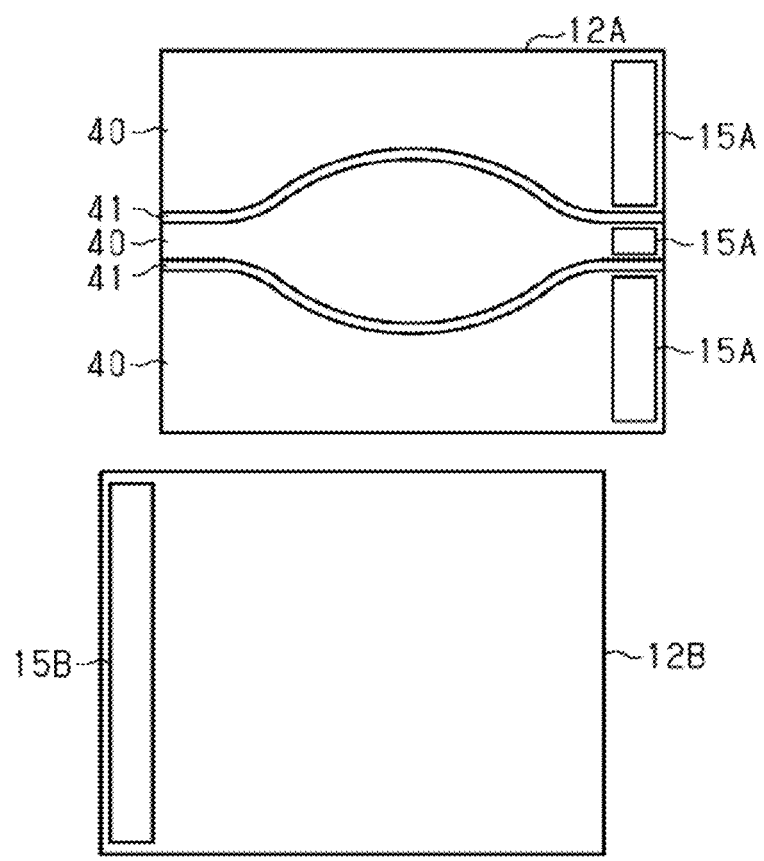
FIG. 25 is a view illustrating a planar structure of transparent electrode layer in a light control sheet of a modified example.

As shown in FIG. 25, similarly to the light control sheet 10 described above, the light control sheet 17 may have the form in which only the first transparent electrode layer 12A includes the electrode sections 40 divided corresponding to the light control sections 30, or the form in which the first transparent electrode layer 12A and the second transparent electrode layer 12B include the electrode sections 40 and 45, respectively, corresponding to the light control sections 30.

In production of the light control sheet 17, similarly to the light control sheet 10, the multilayer laminate 20 is irradiated with the laser in any of the four irradiation modes described above. According to the production method of the present embodiment, the shape of the light control section 30 can be modified by changing the shape of line processed by laser irradiation, so the light control section 30 having a complicated outer shape can be easily formed.

As described above, the aforementioned embodiment can achieve the following effects.

(1) The insulating section 41, which is a laser-processed region, is located in the first transparent electrode layer 12A That is, since the first transparent electrode layer 12A is patterned by laser irradiation for forming the insulating section 41, it is possible to reduce the number of steps required for producing the light control sheet 10 compared with the production method in which patterning is performed by photolithography and etching. Further, since the first transparent electrode layer 12A is patterned after the multilayer laminate 20 is formed, it is possible to easily cope with design change in the shape of the light control sheet 10, the electrode section 40, or the like.

(2) In the first irradiation mode and the third irradiation mode, the light control layer 11 is irradiated with the laser via the first transparent conductive layer 21A in laser irradiation to the multilayer laminate 20 so that the insulating section 41 is formed in the first transparent conductive layer 21A. According to this production method, since the insulating section 41 is formed in the transparent conductive layer, which is one of the two transparent conductive layers located closer to a laser light source, irradiation conditions such as focus and laser power can be easily set.

(3) In the third irradiation mode and the fourth irradiation mode, in formation of the insulating section 41 in the first transparent conductive layer 21A, loss of conductivity in part of the second transparent electrode layer 21B can be allowed. Accordingly, the first transparent conductive layer 21A is more likely to receive sufficient energy from the laser compared with the case where the insulating portion is formed only in the first transparent conductive layer 21A. Therefore, the insulating section 41 can be suitably formed in the first transparent conductive layer 21A. That is, with the configuration in which the second transparent electrode layer 12B includes the strip section 46 which overlaps the insulating section 41, the insulating section 41 of the first transparent electrode layer 12A and the strip section 46 of the second transparent electrode layer 12B can be collectively formed by laser irradiation. Therefore, the insulating section 41 can be suitably formed.

(4) In the form in which the boundary section 31 is formed of the rounded strip-shaped region Cs, the insulating section 41 can be suitably formed by a pulsed laser. Use of a pulsed laser enables formation of the insulating section 41 while dissipating heat generated by laser irradiation. Accordingly, generation of air bubbles in the light control layer 11 can be reduced.

(Modifications)

The above embodiment can be implemented with modifications as described below.

The insulating section 41 of the first transparent electrode layer 12A may not be necessarily provided for forming a plurality of electrode sections 40 corresponding to a plurality of light control sections 30 as long as the first transparent electrode layer 12A is partitioned by the insulating section 41. That is, the only requirement is that the first transparent electrode layer 12A is divided into a plurality of regions, a laser-processed region is located at a boundary between the adjacent regions among the plurality of regions, and the adjacent regions are insulated from each other by the laser-processed region having insulating properties in at least a center part in the width direction. Regardless of the purpose for providing the insulating section 41, the same effects as those of the above (1) can be obtained as long as the patterning of the first transparent electrode layer 12A is performed by laser irradiation.

The light control sheet, when in use, is attached to a transparent member. The surface on which the light control sheet is attached may be a flat surface or a curved surface. For example, the light control sheet may be attached to building materials such as a window glass, a partition, and a glass wall, or a vehicle member such as a window glass of an automobile. According to the production method of the above embodiment, unlike the production method in which the insulating section is formed by etching, the insulating section 41 can be easily formed after the multilayer laminate 20 is processed to have a curved surface. Therefore, the production method of the above embodiment can be suitably used for production of a light control sheet having a curved surface.

The present application addresses the following. A light control sheet having a plurality of light control sections is formed by providing a light control layer between a transparent electrode layer supported by a first transparent support layer and another transparent electrode layer supported by a second transparent support layer. A plurality of electrode sections are formed by patterning a single transparent conductive film supported by the transparent support layer by means of etching before the light control layer is provided. A series of steps required for patterning the transparent conductive film, such as formation of a resist mask, exposure, development, etching, removal of the resist mask, and cleaning, causes a significant increase in the number of steps for producing the light control sheet.

The above problem is not limited to production of a light control sheet having a plurality of light control sections, but also applies to production of a light control sheet having a patterned transparent electrode layer.

An aspect of the present invention is to provide a light control sheet capable of reducing the number of steps required for production, and a method for producing the light control sheet.

A light control sheet for solving the above problem includes a light control layer containing a liquid crystal composition; a pair of transparent electrode layers, which are composed of a first transparent electrode layer and a second transparent electrode layer, the pair of transparent electrode layers sandwiching the light control layer; and a pair of transparent support layers sandwiching the light control layer and the pair of transparent electrode layers. Further, an insulating section, which is a laser-processed region, is located in the first transparent electrode layer.

With this configuration, the insulating section can be formed by laser irradiation, and the first transparent electrode layer can be partitioned by the insulating section. Accordingly, compared with a light control sheet having a first transparent electrode layer patterned by etching, the number of steps required for production of a light control sheet can be reduced.

In the above configuration, the first transparent electrode layer includes a portion made of a conductive film, and the conductive film may be broken in the insulating section.

The insulating section can be suitably formed by laser irradiation.

In the above configuration, the light control sheet may further include a functional layer in contact with the first transparent electrode layer, the functional layer being the light control layer or a layer located between the light control layer and the first transparent electrode layer, wherein the pair of transparent support layers may be composed of a first transparent support layer and a second transparent support layer, the first transparent support layer may support the first transparent electrode layer, the first transparent electrode layer may include a portion made of a conductive film, the conductive film may be removed from the first transparent support layer in the insulating section, and a fragment of the conductive film removed from the first transparent support layer may be located near the insulating section in the functional layer.

The insulating section can be suitably formed by laser irradiation to the transparent conductive layer in a state in which the light control layer is sandwiched between two sheets, each composed of the transparent support layer and the transparent conductive layer.

In the above configuration, the light control sheet may further include a functional layer in contact with the first transparent electrode layer, the functional layer being the light control layer or a layer located between the light control layer and the first transparent electrode layer, wherein a portion of the first transparent electrode layer other than the insulating section may be a conductive section, and a content of at least some of a plurality of elements constituting the conductive section may be higher in a portion of the functional layer in contact with the insulating section than in a portion of the functional layer in contact with the conductive section.

The insulating section can be suitably formed by laser irradiation to the transparent conductive layer in a state in which the light control layer is sandwiched between two sheets, each composed of the transparent support layer and the transparent conductive layer.

In the above configuration, a surface of the insulating section may be rougher than that of a portion of the first transparent electrode layer adjacent to the insulating section.

The insulating section can be suitably formed by laser irradiation to a single transparent conductive layer.

In the above configuration, the second transparent electrode layer may be a strip section including a laser-processed region, the strip section including insulating portions intermittently arranged in an extending direction of the strip section, and the insulating sections may overlap the strip section when viewed in a direction perpendicular to a surface of the light control sheet.

With this configuration, the insulating section in the first transparent electrode layer and the strip section in the second transparent electrode layer can be collectively formed by laser irradiation. Accordingly, in formation of the insulating section in the first transparent electrode layer, loss of conductivity in part of the second transparent electrode layer can be allowed. Accordingly, the insulating section can be suitably formed by laser irradiation.

In the above configuration, when viewed in a direction perpendicular to a surface of the light control sheet, a region where the insulating section is located may have a visible light transmittance lower than a visible light transmittance of a region of the first transparent electrode layer where a portion other than the insulating section is located when viewed in a direction perpendicular to the surface.

The insulating section can be suitably formed by laser irradiation.

In the above configuration, when viewed in a direction perpendicular to a surface of the light control sheet, a region where the insulating section is located may be formed as a strip-shaped region having an outer shape formed of a sequence of a plurality of rounded regions arranged in one direction.

The insulating section can be suitably formed by a pulsed laser. Use of a pulsed laser enables formation of the insulating section while dissipating heat generated by laser irradiation. Accordingly, generation of air bubbles in the light control layer can be reduced.

In the above configuration, the first transparent electrode layer may include a plurality of electrode sections separated by the insulating section, and the plurality of electrode sections may be configured to receive different voltage signals.

With this configuration, a plurality of electrode sections can be formed by laser irradiation. Accordingly, the number of steps required for production of a light control sheet having a plurality of light control sections can be reduced.

A method of producing a light control sheet, the method includes: forming a multilayer laminate in which a light control layer containing a liquid crystal composition is sandwiched between a first transparent conductive layer supported by a first transparent support layer and a second transparent conductive layer supported by a second transparent support layer; and forming an insulating section in the first transparent conductive layer by laser irradiation to the multilayer laminate by which a laser beam penetrates a transparent support layer, which is one of the first and second transparent support layers located closer to a laser source than the first transparent conductive layer is.

With this production method, the insulating section can be formed in one step in which the multilayer laminate is irradiated with a laser. Accordingly, the number of steps required for production of a light control sheet can be reduced.

In the above production method, the laser irradiation to the multilayer laminate may include laser irradiation to the light control layer via the first transparent conductive layer.

With this production method, the insulating section can be suitably formed. Further, since the insulating section is formed in the transparent conductive layer, which is one of the two transparent conductive layers located closer to a laser light source, irradiation conditions such as a focus and a laser power can be easily set.

In the above production method, the laser irradiation to the multilayer laminate may include laser irradiation to the light control layer via the second transparent conductive layer.

With this production method, the insulating section can be suitably formed.

In the above production method, the laser irradiation to the multilayer laminate may include forming a portion in which insulating portions are continuously arranged as the insulating section in the first transparent conductive layer, and forming a portion in which insulating portions are continuously or intermittently arranged in the second transparent conductive layer.

With this production method, in formation of the insulating section in the first transparent conductive layer, loss of conductivity in part of the second transparent electrode layer can be allowed. Accordingly, the insulating section can be suitably formed in the first transparent conductive layer.

Also, the number of steps for production of a light control sheet can be reduced.

REFERENCE SIGNS LIST

Cs . . . Rounded strip-shaped region
Ss . . . Straight strip-shaped region
Fg . . . Fragment
Pc . . . Element
10, 10N, 10R, 16, 17 . . . Light control sheet
11 . . . Light control layer
12A, 12B . . . Transparent electrode layer
13A, 13B . . . Transparent support layer
14A, 14B . . . Alignment layer
15A, 15B . . . Terminal portion
20 . . . Multilayer laminate
21A, 21B . . . Transparent conductive layer
30 . . . Light control section
31 . . . Boundary section
40, 45 . . . Electrode section
41, 47 . . . Insulating section
46 . . . Strip portion
50 . . . Control unit
60 . . . Laser apparatus Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
a light control layer comprising a liquid crystal composition;
a pair of transparent electrode layers including a first transparent electrode layer and a second transparent electrode layer, and sandwiching the light control layer; and
a pair of transparent support layers sandwiching the light control layer and the pair of transparent electrode layers and comprising a first transparent support layer and a second transparent support layer,
wherein the first transparent electrode layer is formed on the first transparent support layer and includes a plurality of electrode portions and an insulating portion comprising a structure formed by laser irradiation such that the electrode portions are separated by the insulating portion.

2. The light control sheet according to claim 1, wherein the first transparent electrode layer comprises a conductive film, and the structure of the insulating portion is formed by breaking a portion of the conductive film by the laser irradiation.

3. The light control sheet according to claim 1, wherein the first transparent electrode layer comprises a conductive film comprising the plurality of electrode portions and the insulating portion such that the insulating portion includes a fragment of the conductive film removed from the first transparent support layer.

4. The light control sheet according to claim 1, wherein the first transparent electrode layer includes a plurality of elements and is modified by the laser irradiation such that a content of at least one of the elements is higher in a portion of the light control layer in contact with the insulating portion than in a portion of the light control layer in contact with the plurality of electrode portions.

5. The light control sheet according to claim 1, wherein a surface of the insulating portion is rougher than a surface of a portion of the first transparent electrode layer adjacent to the insulating portion.

6. The light control sheet according to claim 1, wherein the second transparent electrode layer includes a strip-shaped insulating portion including a plurality of insulating portions formed by laser irradiation such that the insulating portions are separated from one another and positioned in an extending direction of the strip-shaped insulating portion, and that the strip-shaped insulating portion of the second transparent electrode layer overlaps with the insulating portion of the first transparent electrode layer in a direction perpendicular to a surface of the light control sheet.

7. The light control sheet according to claim 1, wherein a visible light transmittance in a direction perpendicular to a surface of the light control sheet is lower in a region where the insulating portion of the first transparent electrode layer is formed than in a region of the first transparent electrode layer where the insulating portion is not formed.

8. The light control sheet according to claim 1, wherein the insulating portion of the first transparent electrode layer is part of a strip-shaped region having an outer shape including a plurality of rounded regions connected and extended in one direction, in a direction perpendicular to a surface of the light control sheet.

9. The light control sheet according to claim 1, wherein the electrode portions of the first transparent electrode layer are configured to receive different voltage signals.

10. A method of producing a light control sheet, comprising:
forming a multilayer laminate in which a light control layer comprising a liquid crystal composition is sandwiched between a first transparent conductive layer formed on a first transparent support layer and a second transparent conductive layer formed on a second transparent support layer; and
applying laser irradiation to the multilayer laminate such that a laser beam penetrates one of the first and second transparent support layers located closer to a laser source than the first transparent conductive layer, and that an insulating portion and a plurality of electrode portions separated by the insulating portion are formed in the first transparent conductive layer.

11. The method according to claim 10, wherein the laser irradiation includes applying the laser beam to the light control layer via the first transparent conductive layer.

12. The method according to claim 10, wherein the laser irradiation includes applying the laser beam to the light control layer via the second transparent conductive layer.

13. The method according to claim 10, wherein the laser irradiation is conducted such that the insulating portion including a plurality of insulating portions connected to one another is formed in the first transparent conductive layer, and that a plurality of insulating portions are formed in the second transparent conductive layer.

14. The method according to claim 13, wherein the laser irradiation is conducted such that the insulating portions connected to one another are formed in the second transparent conductive layer.

15. The method according to claim 13, wherein the laser irradiation is conducted such that the insulating portions separated from one another are formed in the second transparent conductive layer.

16. The light control sheet according to claim 1, further comprising:
a plurality of terminal portions formed on the first transparent support layer such that the plurality of terminal portions is configured to apply voltage signals to the plurality of electrode portions, respectively.

17. The light control sheet according to claim 1, further comprising:
an alignment layer formed between the light control layer and the first transparent electrode layer.

18. The light control sheet according to claim 1, further comprising:
a first alignment layer formed between the light control layer and the first transparent electrode layer; and
a second alignment layer formed between the light control layer and the second transparent electrode layer.

19. The light control sheet according to claim 1, further comprising:
a plurality of first terminal portions formed on the first transparent support layer such that the plurality of first terminal portions is configured to apply voltage signals to the plurality of electrode portions, respectively; and
a second terminal portion formed on the second transparent support layer.

20. The light control sheet according to claim 1, wherein the second transparent electrode layer is formed on the second transparent support layer and includes a plurality of second electrode portions and a second insulating portion comprising a structure formed by laser irradiation such that the second electrode portions are separated by the second insulating portion.

* * * * *